UNITED STATES PATENT OFFICE.

CHARLES J. EAMES, OF NEW YORK, N. Y., ASSIGNOR TO THE CARBON IRON COMPANY, OF SAME PLACE.

PROCESS OF REDUCING IRON ORE.

SPECIFICATION forming part of Letters Patent No. 318,606, dated May 26, 1885.

Application filed February 27, 1885. (No specimens.)

*To all whom it may concern:*

Be it known that I, CHARLES J. EAMES, a citizen of the United States, residing in New York city, in the State of New York, have invented a new and useful improvement in processes of reducing iron ore in the manufacture of iron sponge and wrought-iron and steely irons directly from the ore; and I hereby declare the following to be a full and exact description of the same, such as will enable others to practice the invention.

The invention, generally stated, may be said to consist in intermingling with the ore in its natural state and without added flux, lumps of graphitic carbon, and subjecting the mixture in an ordinary reverberating furnace or other suitable furnace, first to a sustained dull-red heat and then preferably to a higher and sustained temperature for the production of iron sponge and wrought or steely irons directly from the ore.

Heretofore in the manufacture of iron sponge and iron direct from the ore the most commonly-employed deoxidizing agent has been charcoal. The most common method of procedure has been to mix with prepared or separated iron ore pulverized charcoal, then to place the charge of ore and charcoal in a hermetically-sealed chamber, said chamber being heated externally, and not to allow the charge to come in contact with the flame until it has been deoxidized. The main objections to this method commonly practiced may be briefly stated to be, first, the length of time required to deoxidize the ore; secondly, the cost of preparing and separating the ore from its gangue and the mixing pulverized charcoal with the ore; thirdly, the separating of the charcoal from the ore when in the deoxidizing-chamber, owing to the difference in specific gravity, causing imperfect deoxidation of the charge and the consequent loss of ore; fourthly, the reoxidation of the ore when passing from the deoxidizing-chamber to the furnace. Again, when charcoal or plumbago, &c., is used in the ordinary condition—that is, as a powdered mass admixed with the prepared ore—it cannot be uniformly distributed or kept properly distributed, is drifted or carried out by the blast, producing irregularity in the results obtained, and where used in conjunction with a fusible slag-covering for the ore it rises into the fusible slag and the greater portion is lost without obtaining any results. To these objections must be added the material one of the high price of plumbago and the large amount of charcoal and other forms of soft carbons required in former processes, which add materially to the expense of producing wrought-iron or steel from the ore by the methods now commonly practiced. With this acknowledgment and review of the prior state of the art, it will clearly appear from the following description wherein my invention lies.

In carrying out my invention I make use of a reverberatory or other suitable furnace in which the charge may be subjected to the direct action of the flame and a moderate and controllable temperature can be maintained. The ore as taken from the mines is intermingled with lumps of graphitic carbon, said graphitic carbon constituting such a per cent. of the charge as shall approximate the quantity required to deoxidize the ore and to carburize it to the extent desired, (which can readily be ascertained by analysis,) say about thirty to fifty per cent. The layer of intermingled ore and graphitic lumps composing the charge should preferably be from four to eight inches in depth.

The graphitic carbon referred to is an impure graphitic agglomeration containing considerable quantities of earthy matters, iron, &c., of a character such as is found at Cranston, Rhode Island, and elsewhere, and known in the trade as "graphitic carbon."

The furnace having been charged with the mixture of ore and graphitic carbon above specified, is raised and maintained at a dull-red heat, say 1,500° Fahrenheit to 2,000° Fahrenheit, (varied to meet the nature of more or less refractory ores,) at which temperature deoxidation will take place without danger of fusion. This temperature is sustained for from five to seven hours, by which time deoxidation will have been completed, and an iron sponge containing the free metal inclosed in its earthy matrix will have been obtained. The heat is then raised sufficiently to cause an agglomeration of the mass, or the agglutination of the contained metal, (say from 2,000° Fahrenheit to 2,500° Fahrenheit or more,) but not sufficiently high to fuse the mass. When this temperature has been maintained for from one to two hours, the mass can be balled and removed to the blooming apparatus for reduction to wrought-iron; but if a steely iron is desired this higher heating must be prolonged some six or seven hours, which can be readily determined by the operator, and necessarily varies according to the more or less refractory character of the ore, as before specified. Finally, the steelified mass will be balled and removed to the blooming apparatus, as before specified. During this higher heat, or second stage of the process, care should be taken to avoid excessive temperature, as fusion of the metal would insure the formation of slaggy sponge of deteriorated character.

Some of the advantages of my process are that the lumps of graphitic carbon interposed between the lumps of ore lighten up the mass and permit the circulation of the heat-bearing gases through it, while the carbon is immediately presented to the ore to be deoxidized, and in such form that it can be kept uniformly distributed throughout the charge, and is not drifted about and not swept off by the blasts of gas or the action of the heated mass, &c.

I do not herein claim charging the ore intermingled with lumps upon a friable graphitic hearth, as the same forms the subject-matter of a prior case Serial No. 149,683, filed December 6, 1884. Neither do I claim covering the charge so intermingled with graphitic lumps with a protective layer of graphitic lumps, as the same forms the subject-matter of case Serial No. 149,683, filed December 6, 1884. Likewise, the use of the friable graphitic hearth forms the subject-matter of case Serial No. 144,152, filed September 27, 1884, and the use of the friable graphitic hearth with graphitic lump covering, and graphitic lumps intermingled with the charge, the process being continued until steelified iron is produced, forms the subject-matter of case Serial No. 157,226, of even date herewith. Consequently I herein claim neither of said processes, the characteristic feature of the present invention being the omission of the friable hearth and friable lump covering, and the treatment of the ore in its natural state, having from about thirty to fifty per cent. of graphitic lumps mingled therewith.

What I claim as new, and desire to secure by Letters Patent, is—

1. The process herein described of producing iron sponge direct from the ore, which consists in intermingling the ore in its natural state with lumps of graphitic carbon, and subjecting the mixture in a reverberatory or other suitable furnace to a dull-red sustained heat until deoxidation is accomplished, substantially as and for the purposes set forth.

2. The process herein described, which consists in intermingling the ore in its natural state with lumps of graphitic carbon, subjecting the mixture in a reverberatory or other suitable furnace to a dull-red sustained heat until deoxidation is accomplished, and then to a higher sustained heat for a suitable short period to agglomerate the mass, so that the sponge can be balled and removed to the blooming apparatus for the production of wrought-iron, as hereinbefore described, or for a suitable longer period for the production of steelified iron, as described, substantially as and for the purposes set forth.

In testimony whereof I affix my signature, in presence of two witnesses, this 27th day of February, 1885.

CHARLES J. EAMES.

Witnesses:
 F. W. RITTER, Jr.,
 G. A. TAUBERSCHMIDT.